(12) United States Patent
Gabaldo et al.

(10) Patent No.: US 10,927,793 B2
(45) Date of Patent: Feb. 23, 2021

(54) ENGINE FOR HYPERSONIC AIRCRAFTS WITH SUPERSONIC COMBUSTOR

(71) Applicants: Marco Gabaldo, Belo Horizonte (BR); Jose Eduardo Mautone Barros, Bela Horizonte (BR)

(72) Inventors: Marco Gabaldo, Belo Horizonte (BR); Jose Eduardo Mautone Barros, Bela Horizonte (BR)

( * ) Notice: Subject to any disclaimer, the term of this patent is extended or adjusted under 35 U.S.C. 154(b) by 205 days.

(21) Appl. No.: 15/563,879

(22) PCT Filed: Apr. 3, 2015

(86) PCT No.: PCT/IT2015/000096
§ 371 (c)(1),
(2) Date: Oct. 2, 2017

(87) PCT Pub. No.: WO2016/157224
PCT Pub. Date: Oct. 6, 2016

(65) Prior Publication Data
US 2018/0119644 A1 May 3, 2018

(51) Int. Cl.
*F02K 7/00* (2006.01)
*F02K 7/18* (2006.01)
(Continued)

(52) U.S. Cl.
CPC ............ *F02K 7/18* (2013.01); *F02C 3/24* (2013.01); *F02C 7/042* (2013.01); *F02K 1/06* (2013.01);
(Continued)

(58) Field of Classification Search
CPC ..... F02K 7/18; F02K 7/14; F02K 7/16; F02K 1/06; F02K 3/075; F02C 3/24;
(Continued)

(56) References Cited

U.S. PATENT DOCUMENTS 3,883,320 A * 5/1975 Strukl ............... C10L 1/14
44/359
5,159,809 A * 11/1992 Ciais ............... F02K 7/16
60/225
(Continued)

FOREIGN PATENT DOCUMENTS

DE 1144060 B 2/1963
EP 1138922 A1 10/2001

OTHER PUBLICATIONS

Germain et al, An Evaluation of Two Alternate Propulsion Concepts for Bantam-Argus: Deeply-Cooled Turbojet + Rocket and Pulsed Detonation Rocket + Ramjet, AIAA, Jun. 1999 (Year: 1999).*
(Continued)

*Primary Examiner* — Todd E Manahan
*Assistant Examiner* — Edwin Kang
(74) *Attorney, Agent, or Firm* — Seyfarth Shaw LLP

(57) ABSTRACT

Described is a propulsion system (1) for hypersonic aircraft, having an air inlet (10) of a fluid (110), a containment duct (20) and an exhaust nozzle (30). The propulsion system (1) comprises a bypass duct (40) for a flow (100) of fluid (110), an air-breathing engine (22) and a rocket (23) configured for processing respective flows (22a, 23a) of fluid (110). The bypass duct (40), the air-breathing engine (22) and the rocket (23) are operatively associated with each other in such a way as to generate a thermodynamic-fluid interaction in a same portion of space (33) between the respective flows (40a, 22a, 23a) processed in an operating configuration of the propulsion system (1) and wherein the portion of space (33) is inside the containment duct (20).

25 Claims, 7 Drawing Sheets

(51) Int. Cl.
*F02K 1/06* (2006.01)
*F02K 3/02* (2006.01)
*F02K 3/08* (2006.01)
*F02K 7/14* (2006.01)
*F02C 3/24* (2006.01)
*F02C 7/042* (2006.01)

(52) U.S. Cl.
CPC ............... *F02K 3/02* (2013.01); *F02K 3/08* (2013.01); *F02K 7/14* (2013.01); *F05D 2220/10* (2013.01); *F05D 2250/311* (2013.01)

(58) Field of Classification Search
CPC ............... F02C 7/057; F05D 2220/10; B64D 2033/026; B64D 33/02
See application file for complete search history.

(56) References Cited

U.S. PATENT DOCUMENTS

| | | | | |
|---|---|---|---|---|
| 6,883,302 | B2* | 4/2005 | Koshoffer | F02K 3/075 60/204 |
| 2002/0134070 | A1* | 9/2002 | Orlando | F01D 9/041 60/204 |
| 2006/0242941 | A1* | 11/2006 | Johnson | F02C 9/54 60/226.1 |
| 2008/0283677 | A1* | 11/2008 | Pederson | B64C 30/00 244/73 R |
| 2016/0003187 | A1* | 1/2016 | Roberge | F02K 3/02 415/1 |

OTHER PUBLICATIONS

Cooper et al, Thermal and Catalytic Cracking of JP-10 for Pulse Detonation Engine Applications, Dec. 2002 (Year: 2002).*
Air and Space Museum, Hypersonic Flight, 2012 (Year: 2012).*
Varvill R., et al., "A Comparison of Propulsion Concepts for SSTO Reusable Launchers", Journal of British Interplanetary Society, vol. 56, No. 3/04, Mar. 1, 2003, pp. 108-117.
Daines R. et al., "Combined Rocket and Airbreathing Propulsion Systems for Space-Launch Applications", Journal of Propulsion and Power, American Institute of Aeronautics and Astronautics, vol. 14, No. 5, Sep. 1, 1998, pp. 605-612.
International Search Report and Written Opinion—PCT/IT2015/000096.
Lin, Charles C.H., et al., "Ionospheric plasma hole and gigantic shock waves induced by the launch of FORMOSAT-5 using the Space-X rocket" Research Express@NCKU, vol. 31, Issue 8 (Apr. 27, 2018).

* cited by examiner

ENGINE FOR HYPERSONIC AIRCRAFTS WITH SUPERSONIC COMBUSTOR

TECHNICAL FIELD

This invention relates to a propulsion system for hypersonic aircraft with a supersonic combustor.

More specifically, this invention relates to a propulsion system for hypersonic aircraft having a supersonic combustor which is ignited by a rocket, in other words, a propulsion system for hypersonic aircraft having a supersonic RAM combustor which is ignited by a rocket. The propulsion system according to this invention is suitable for fitting to aircraft configured to reach hypersonic steady state flight, in particular the propulsion system, according to this invention, can be used on board aircraft used in the aerospace sector for hypersonic flight.

This invention relates to a propulsion system for hypersonic aircraft configured to operate from a fixed point to hypersonic steady state speed and from an altitude at sea level to an altitude which comprises the terrestrial exosphere.

Background

In the prior state of the art there are various configurations of propulsion systems for aerospace applications in which there are two particular main configurations, that is, the pure SCRAMJet propulsion system or the combined cycle SCRAMjet propulsion system. Both the above-mentioned types of propulsion system have in common that the propulsion system must already be at supersonic steady state to allow a flow of air at the inlet. The flow of air introduced in the propulsion system is processed by injection of fuel inside a supersonic combustor.

Following prior state of the art thermodynamic-fluid interactions and transformations the flow of fluid is processed by a train of shock waves which allow a combustion process between fuel and comburent. Generally, the flow of fluid which is greatly energised (thermal energy in particular) is subjected to an expansion through a divergent nozzle of the propulsion system converting the high thermal energy into kinetic energy to obtain a predetermined thrust.

The propulsion systems for aerospace applications such as those described above have some drawbacks and limitations in their use.

With reference to the pure SCRAMJet propulsion system configuration it should be noted that it is a propulsion system for which it is necessary to use special means for bringing the SCRAMJet engine to the optimum operational condition, in particular with regard to the relative speed and altitude values. In effect, aircraft fitted with a pure SCRAMJet propulsion system are often carried to the ideal altitude and operating speed for the SCRAMJet by using a transport aircraft configured for fastening/transporting the aircraft with the SCRAMJet propulsion system.

A further limitation is given by the fact that supersonic steady state combustion requires a fuel suitable for that steady state, which considerably limits the choice of the fuel be used.

This limitation often forces the use of hydrogen which is the best fuel because it has, for example, a speed of propagation of the flame, an inflammability and a specific heat suitable for the operating conditions of the SCRAMJet propulsion system.

A direct consequence of this operating condition of the pure SCRAMJet propulsion system is that the combustion of the fuel occurs in a region very close to the parts of the combustor, especially if the flame is very close to the injectors of the combustor.

The combustion flame close to the walls of the propulsion system produces a problem of overheating of the parts themselves, for which various technologically complex measures has been adopted for achieving a sufficient insulation and/or cooling of the thermally stressed parts.

A further and different drawback relative to the pure SCRAMJet propulsion systems lies in the type of propagation of the shock waves generated inside the propulsion system which, also due to the geometrical configuration of the combustor described above, enter into direct contact with the perimeter walls of the propulsion system causing vibrations which are harmful for the propulsion system. Moreover, the mechanical vibrations of the propulsion system in physical terms represent a dispersion of energy that is not reusable, which could instead be directly transformed (kinetic energy) to the advantage of the propulsive effect. For example, patent document U.S. Pat. No. 5,333,445A illustrates a pure type SCRAMJet propulsion system.

With reference to the combined type SCRAMJet propulsion system configuration it should be noted that it is a propulsion system limited by the problems described above for the pure type SCRAMJet propulsion system. In effect, also for the combined type SCRAMJet propulsion system it is necessary to use special means for bringing the SCRAMJet engine to the ideal operating condition. Substantially, the combined type SCRAMJet propulsion system comprises various propulsion systems operatively associated with each other: for example, patent document DE3803876A1 illustrates an air-breathing engine associated with a RAMJet and a pure rocket and used in various modes according to the operating conditions of the propulsion system.

For example, during the take-off of an aircraft fitted with a combined type SCRAMJet propulsion system, both the rocket part and the RAMJet part are used to have an adequate performance during take-off and the first acceleration phase of the flight.

For example, there is of combined cycle variation which uses an air-breathing engine with the aim of powering the rocket (see the Skylon "Sabre" propulsion system).

The combined type SCRAMJet propulsion system suffers from a limitation in terms of efficiency, and thus has a discrete propulsive effect. This limitation is highlighted mostly during the take-off phase of the propulsion system, in general in acceleration from a fixed point, during which the rocket must operate at a steady state together with the RAMJet system, which is not yet at a steady state sufficient to cause the ideal operating conditions (typically for the values of pressure and speed of air flow at inlet).

A further drawback of this propulsion system is the maximum compression which can be achieved, which is a ratio of about 30 to 1, which is a poor value for a generic rocket engine deemed to have a good efficiency.

Aim of the Invention

The aim of the invention is to resolve the problems encountered in the prior state of the art by providing a propulsion system for hypersonic aircraft which can operate over a large range of flight speeds and flight altitudes, in particular from a fixed point and from sea level up to steady state hypersonic speed and/or an altitude greater than that of the terrestrial atmosphere.

More specifically, the aim of this invention to provide a propulsion system for hypersonic aircraft which can operate autonomously, that is to say, without the assistance of other propulsion systems and special means dedicated to the increase in acceleration of the aircraft/propulsion system during the start-up, take-off and climbing.

A further aim of this invention is to provide a propulsion system for hypersonic aircraft used in the aerospace sector or for hypersonic flight in general, such as, for example, for aircraft to be used for space missions, for stratospheric flights for scientific study and research or to fit to aircraft for transporting goods and/or persons with new design concepts, or for UAV type aircraft and missiles.

These and other aims are substantially achieved by a propulsion system for hypersonic aircraft as described in one or more of the appended claims.

Further features and advantages of the present invention are more apparent from the detailed description of a preferred, but non-exclusive, embodiment of a propulsion system for hypersonic aircraft according to this invention.

The dependent claims correspond to possible embodiments of the invention.

BRIEF DESCRIPTION OF THE DRAWINGS

The description of this invention is provided below with reference to the accompanying drawings, which are also non-limiting and provided by way of example only, in which.

Figure 2:
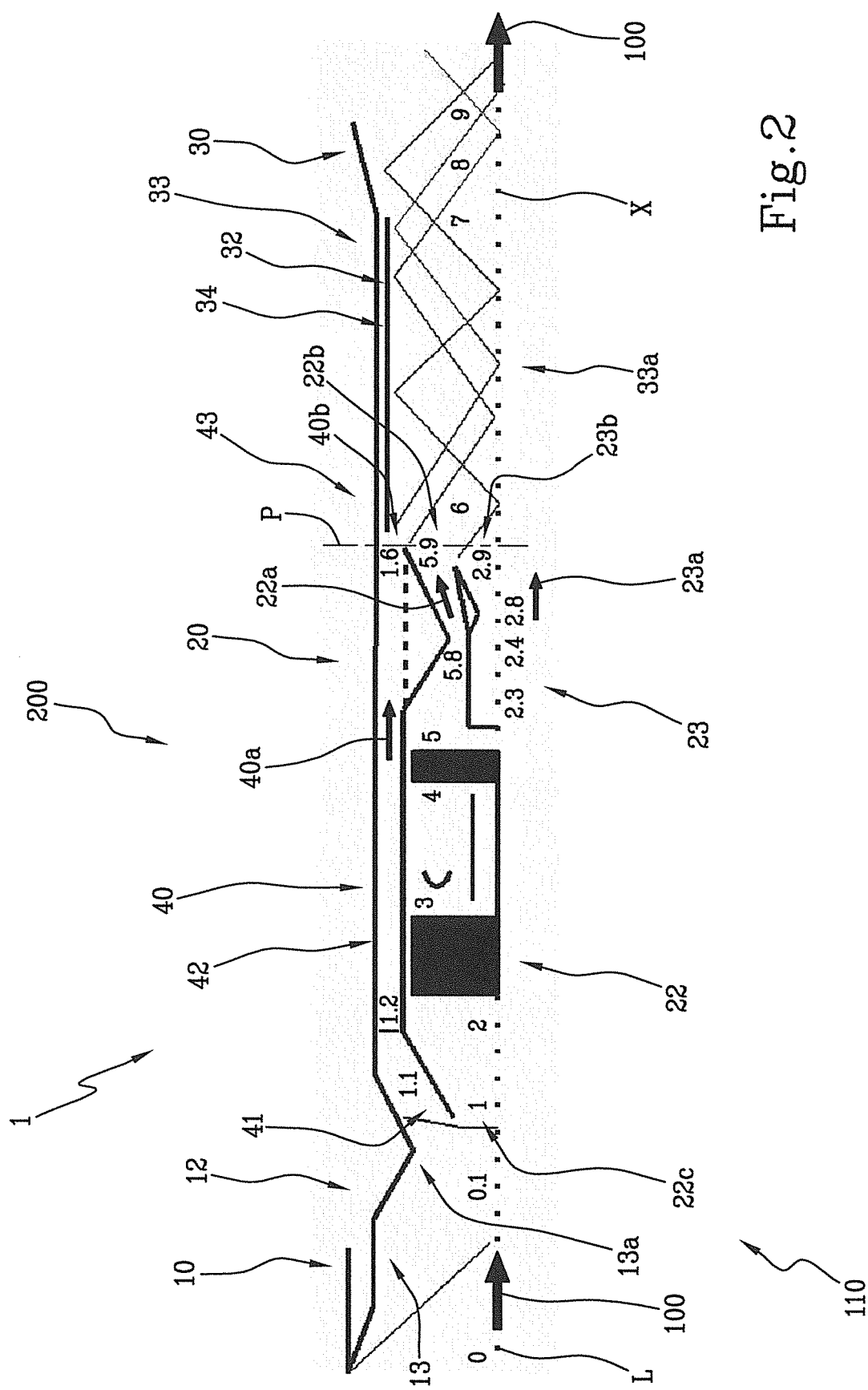
FIG. 2 is a schematic sectional view of the propulsion system of FIG. 1.
Figure 3:
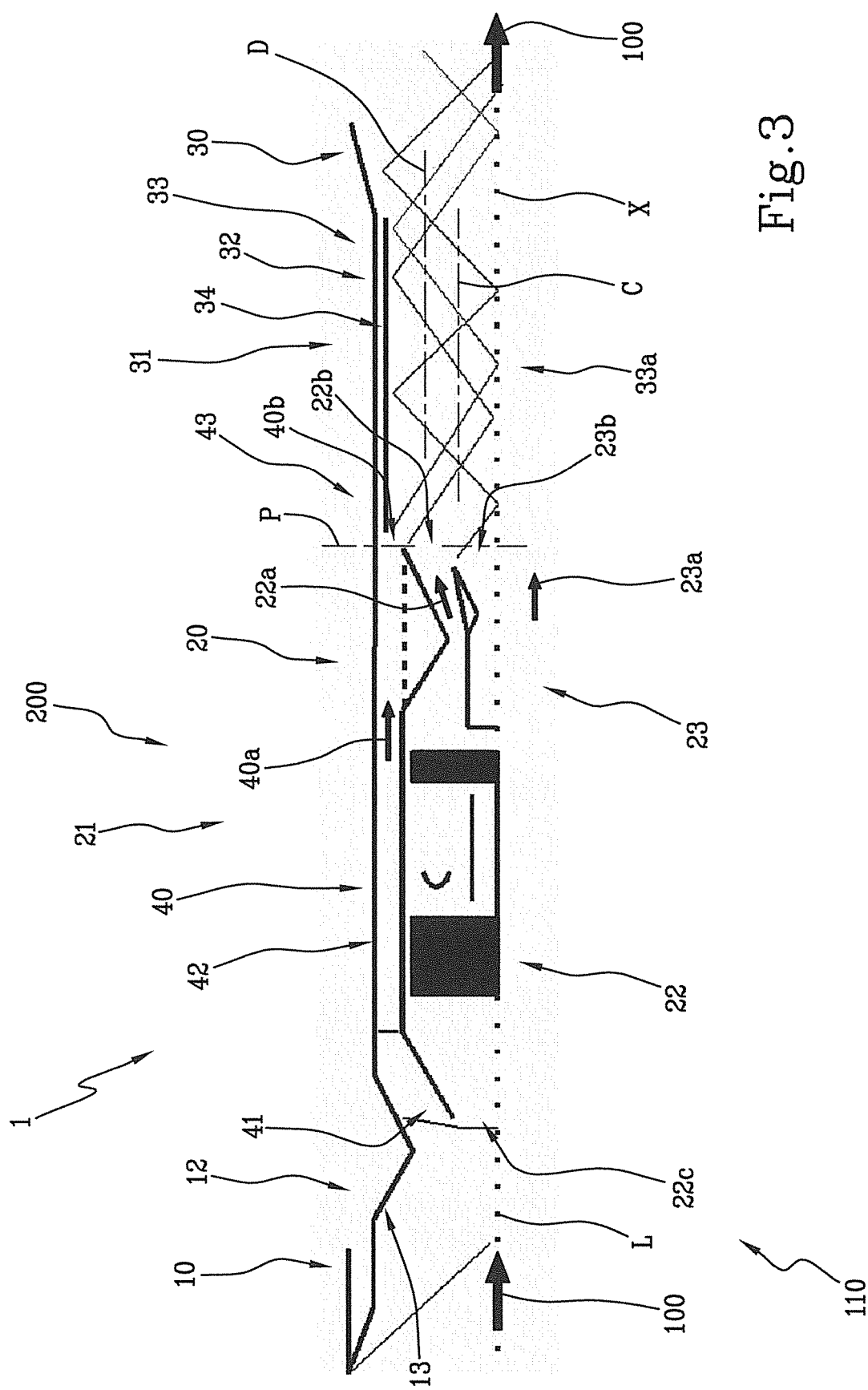
FIG. 3 is a schematic sectional view of the propulsion system of FIG. 2 in an operating configuration in accordance with this invention.
Figure 3A:
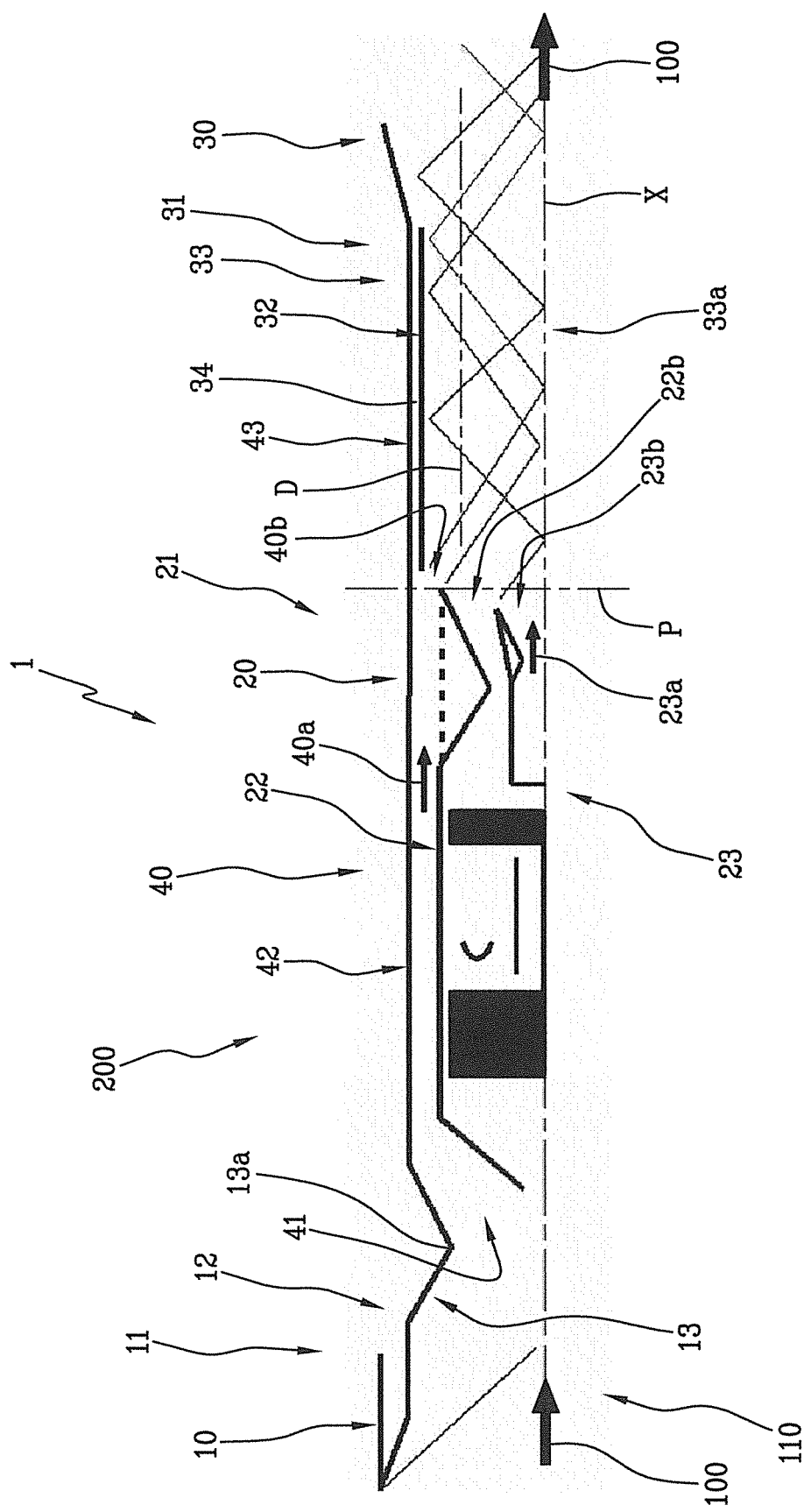
FIG. 3A is a schematic sectional view of the propulsion system of FIG. 2 in a different operating configuration in accordance with this invention.
Figure 3B:
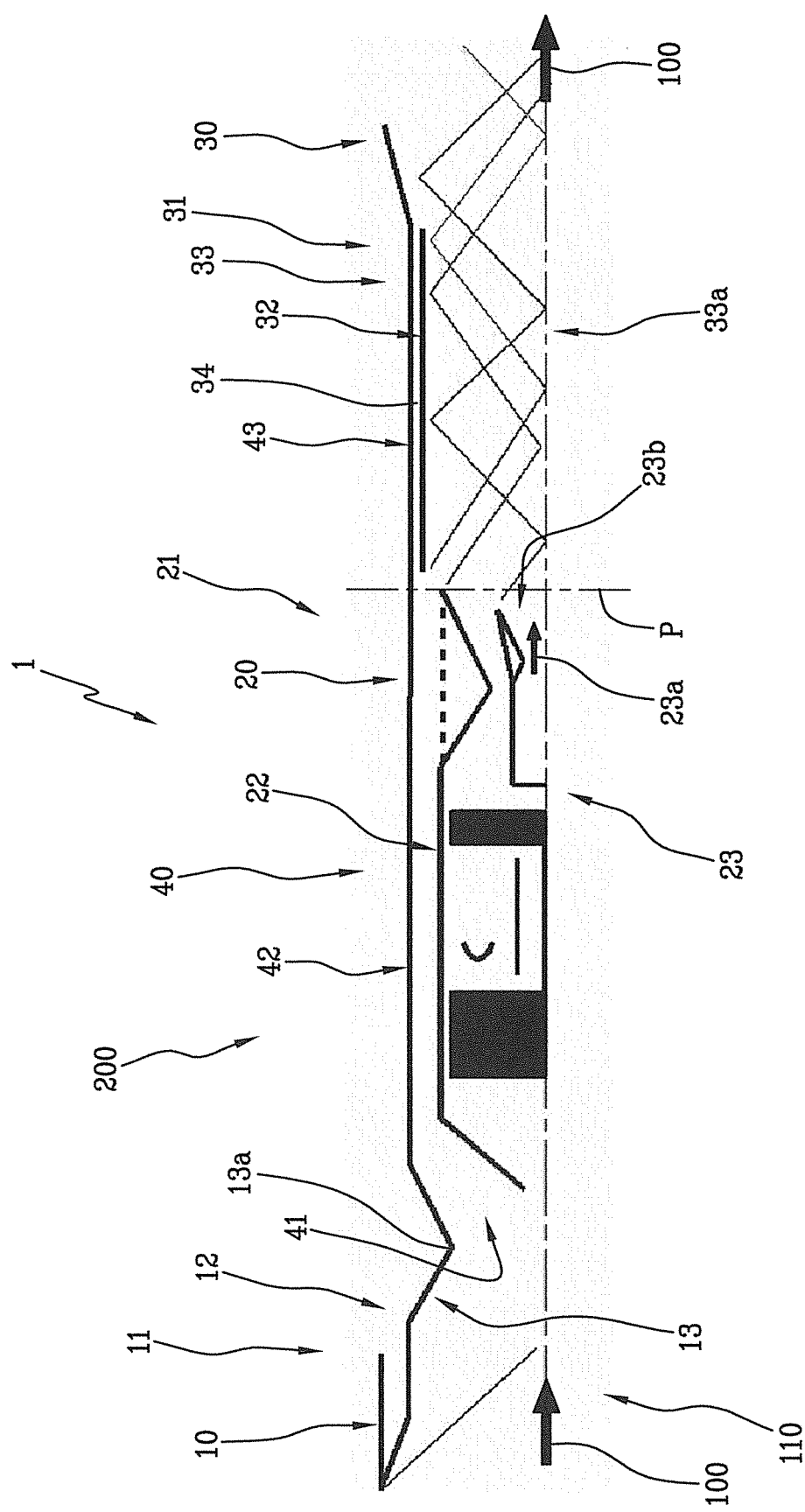
FIG. 3B is a schematic sectional view of the propulsion system of FIG. 2 in a different and further operating configuration in accordance with this invention.

It should be noted that for reasons of convenience and standards, the propulsion system in FIGS. 2 to 3B is shown sectioned along a longitudinal axis.

Moreover, it should be noted that in FIGS. 2 to 3B numerals 0 to 9 denote the functional points of the propulsion system 1 on the basis of standard SAE AS 755— "Aircraft Propulsion System Station Performance Designation".

In short, the points mentioned above are defined below:
0 region of free fluid flow, outside the propulsion system;
0.1 limit section of fluid inlet;
1 fluid intake in an air-breathing engine;
1.1 fluid inlet in a bypass duct;
1.2 annular channel of the bypass duct;
1.6 end of annular channel of bypass duct;
2 inlet flow in a compressor of a air-breathing engine;
2.3 injector of an rocket;
2.4 flow outlet from a combustion chamber of the rocket;
2.8 throat of a nozzle of the rocket;
2.9 outlet section of the rocket;
3 outlet flow from the compressor to a combustion chamber of the air-breathing engine;
4 outlet from the combustion chamber and inlet to a turbine of the air-breathing engine;
5 outlet flow from the turbine;
5.8 throat of an exhaust nozzle of the air-breathing engine;
5.9 outlet section from the air-breathing engine;
6 outlet from the rocket and contact with the outlet flows from the turbine of the air-breathing engine;
7 inlet of the flow of fluid in an exhaust nozzle of the propulsion system;
8 point of little significance;
9 outlet section of the exhaust nozzle of the propulsion system.

The main structural elements of the propulsion system according to this invention are indicated in accompanying FIGS. 1 to 5 with alphanumeric references from 10 to 200.

SUMMARY OF THE INVENTION

This invention relates to a propulsion system for supersonic aircraft comprising an air inlet of a fluid, a containment duct and an exhaust nozzle.

Preferably, the air inlet, the containment duct and the exhaust nozzle are in fluid communication with each other.

Preferably, the fluid is atmospheric air which the propulsion system intercepts from the outside and processes in an operational configuration. The propulsion system according to this invention is susceptible to change to some of the characteristics of the relative operating configuration in accordance with the operating conditions with which it is to operate. By way of a non-limiting example, the operating conditions of the propulsion system, also referred to as operating specifications, are defined by the value of a relative speed of an aircraft fitted with the propulsion system according to this invention, and/or the flight altitude of the aircraft and/or the quantity of fuel still available to perform a flight mission.

The air inlet is preferably square for operating in supersonic and hypersonic steady state conditions, the cross-section of the rocket and the air-breathing engine are preferably circular, the bypass duct, the supersonic combustor and the exhaust nozzle may either have square or circular geometries. Preferably, the air inlet of the propulsion system has a shaped section configured to reduce the viscous friction of the flow of fluid and the formation of recirculation regions of the flow of fluid. Still more preferably, the above-mentioned shaped section has a cusp along a longitudinal direction of extension of the air inlet and/or the propulsion system itself.

Further details relating to the shape of the sections and/or measurements of the sections are described in more detail below.

The propulsion system according to this invention has a longitudinal direction of extension. The longitudinal direction of extension is a straight axis along/about which all the above-mentioned elements are positioned, from the air inlet of the fluid, to the containment duct up the exhaust nozzle. Preferably, the longitudinal direction of extension is a central axis of the propulsion system.

The propulsion system according to this invention also comprises a bypass duct for a flow of fluid, an air-breathing engine and a rocket configured for processing respective flows of fluid as well as a supersonic combustor. Preferably, the bypass duct, the air-breathing engine and the rocket are positioned inside the containment duct of the propulsion system.

The bypass duct, the air-breathing engine and the rocket are operatively associated with each other in such a way as to generate a thermodynamic-fluid interaction between the respective flows processed in the supersonic combustor, by a sequence of shock waves.

Preferably, in accordance with the inventive concept of this invention, the air-breathing engine is positioned inside the bypass duct, the rocket is positioned inside the air-breathing engine and all three of the above-mentioned elements are positioned inside the containment duct of the propulsion system. In other words the arrangement of the bypass duct, the rocket and the air-breathing engine is an arrangement of the coaxial/concentric type relative to the above-mentioned longitudinal direction of extension, preferably relative to the central axis.

Preferably, the bypass duct is configured to interact with the air-breathing engine and/or the rocket in accordance with an operating cycle of a propulsion system of the SCRAMJet type which occurs in the supersonic combustor.

Preferably, the flow from the bypass duct is at a lower temperature than the respective flows from the rocket and/or the air-breathing engine of the propulsion system.

Advantageously, in an operating configuration of the propulsion system, the propulsion system is configured in such a way that the bypass duct, the air-breathing engine and the rocket induced the respective fluid flows correctly calculated and positioned inside the supersonic combustor which is located inside the containment duct.

Preferably, the inner portion of space comprises a region of energy conversion of the propulsion system wherein there is an increase in the enthalpy which can be derived from the conversion of thermal energy into kinetic energy.

In other words, in accordance with this invention, the portion of inner space is the predetermined region in which there is the greatest enthalpic jump in the operating cycle of the propulsion system. For this reason, the region of energy conversion is that region in which the transformation occurs which makes it possible to obtain the predetermined propulsive effect of the propulsion system. Preferably, the region of energy conversion is located in a position radially central relative to the containment duct of the propulsion system. In other words, the region of energy conversion is located in a zone inside the containment duct.

In accordance with the inventive concept of this invention, the above-mentioned region of energy conversion preferably coincides with the above-mentioned supersonic combustor.

Preferably, the portion of inner space is free, that is, it does not contain structural elements configured to trigger a recirculation of the flow of fluid and/or an anchoring of a flame of a combustion process, in an operating configuration of the propulsion system. Preferably, the structure of shock waves created for this type of flow is responsible for anchoring the combustion flame.

In other words, according to this invention, the propulsion system does not use mixers or other structural elements configured to create a support for the flame of a combustion process in the propulsion system, in an operating configuration of the propulsion system.

Most of the conversion due to the above-mentioned thermodynamic-fluid reaction occurs in the region of energy conversion, preferably the totality of the energy conversion occurs in the above-mentioned region of energy conversion, that is, in the supersonic combustor. Advantageously, the propulsion system according to this invention is configured to achieve an energy conversion from a flow of fluid at high temperature to a flow of fluid with a high energy content of the kinetic type in a region confined inside the propulsion system itself.

More specifically, the thermodynamic-fluid reaction occurs where the shock waves are generated from the interactions between the respective flows processed by the bypass duct, the rocket and the air-breathing engine of the propulsion system, in the supersonic combustor.

In other words, the bypass duct, the air-breathing engine and the rocket are configured in such a way that the respective processed flows mix, thus favouring an exchange of energy and an interaction of the physical parameters (temperature of flow, flow speed and the like) which govern the thermodynamic-fluid portions of operation of the propulsion system.

It is important to highlight the fact that the flow of the rocket is rich in unburnt fuel and that this feeds the supersonic combustor. Preferably, the air-breathing engine and the bypass duct are rich in oxygen in turn feed the supersonic combustor.

With reference to the region of the supersonic combustor, the flow of fluid in it comprises at least the respective outlet flows from the outlet sections of the rocket and/or the air-breathing engine and/or the bypass duct, in accordance with an operating configuration of the propulsion system.

Preferably, the combustion process for the air-breathing engine and the rocket may be simultaneous or it may be autonomous and independent, that is, the operation of the air-breathing engine is separate from the operation of the rocket, in accordance with a particular operating condition of the propulsion system.

The propulsion system converts thermal energy generated in the supersonic combustor into kinetic energy through the divergent nozzle, and more specifically in sections 7, 8, 9 of FIG. 2.

Preferably, the flow of fluid processed by the rocket flows centrally relative to the longitudinal direction of extension of the propulsion system.

Preferably, the flow of fluid processed by the air-breathing engine is located in a position radially outside the flow of the rocket and the flow of fluid of the bypass duct is located in a position radially outside the flow of the air-breathing engine.

Preferably, the rocket, the air-breathing engine and the bypass duct comprise respective outlet portions of the respective flows of fluid.

The outlet portions have respective outlet sections lying of a same plane positioned transversally relative to the longitudinal direction of extension of the propulsion system.

Preferably, the outlet portions are coaxial relative to the longitudinal direction of extension.

Preferably, the outlet section of the air-breathing engine is located in a position radially outside the outlet section of the rocket and the outlet section of the bypass duct is located in a position radially outside the outlet section of the air-breathing engine.

The flow of fluid processed by the bypass duct allows a cylindrical case (for example a cylindrical protective shell) to be formed which wraps around and incorporates the outlet flow processed respectively by the rocket and/or the air-breathing engine.

Preferably, the outlet flow from the bypass duct has a temperature and a concentration of oxygen approximately equal to the temperature and concentration of oxygen of the flow of fluid at the air inlet of the propulsion system. In other words, preferably, along the bypass duct there is no combustion process between a fuel and a comburent.

The absence of a combustion process inside the bypass duct does not prevent a change of certain physical parameters of the air flow inside the bypass duct, for example a change of speed and/or pressure of the flow, even located inside the bypass duct.

The propulsion system, according to this invention, comprises a jacket preferably of tubular shape positioned inside the containment duct through the portion of inner space and extending for a stretch between the above-mentioned outlet sections and the exhaust nozzle.

Preferably, the tubular jacket in the containment duct is concentric with the containment duct.

Preferably, the tubular jacket has along its entire extension a transversal cross-section less than a cross-section of the containment duct in such a way as to define between the tubular jacket and the containment duct a transit channel of a uniform flow of fluid.

Preferably, the transit channel is annular in shape and centred on the axis of the propulsion system. Preferably, the tubular jacket is substantially a flame pipe of the propulsion system. The terminologies can therefore be used with the same meaning, however in this description the flame pipe term is preferred to the tubular jacket term.

Preferably, the flame pipe comprises a plurality of through holes along the entire surface which may be a wall which is corrugated or folded in a concertina fashion.

The transit channel divides the flow of fluid coming from the bypass duct making two flows, or rather, the uniform flow of fluid through the annular transit channel is subjected to a reduction in the flow rate by a partial tapping of the flow. The flow tapped in this way is directed towards the region of energy conversion. Preferably, the portion of the residual flow passing through the annular transit channel is a cold flow, that is, not involved in a combustion process.

Preferably, the portion of the residual flow passing through the annular transit channel is kept in a perimeter region relative to the region of energy conversion by the presence of the tubular change in that stretch of the containment duct.

The holes on the surface of the flame pipe allow the simultaneous tapping of the flow processed by the bypass duct and the residual portion of flow to be kept and contained in a perimeter region such as to touch the walls of the containment duct up to the exhaust nozzle of the propulsion system.

With reference to the region of the supersonic combustor of the propulsion system, the outlet flows of the fluid from the respective outlet sections of the rocket and/or the air-breathing engine and/or the bypass duct have a steady state speed of between 1.5 Mach and 3.5 Mach. Preferably, the steady state speed of the outlet flows from the rocket and/or from the air-breathing engine and/or from the bypass duct is approximately 2 Mach.

In a region at an outlet section of the exhaust nozzle of the propulsion system, preferably downstream of the region of energy conversion along the central axis of the propulsion system, the flow of fluid has a steady state speed of between about 1.5 Mach and 30 Mach. Preferably, the flow of fluid from the exhaust nozzle of the propulsion system has a steady state speed equal to 1.5 Mach at an operating altitude equal to that of the sea.

Preferably, the flow of fluid from the exhaust nozzle of the propulsion system has a steady state speed which is approximately 30% to approximately 40% greater than the relative speed of flight of an aircraft fitted with the propulsion system according to this invention.

Preferably, at the region of the supersonic combustor of the propulsion system, the outlet flow from the bypass duct has a pressure value greater than a pressure value of the outlet flow from the air-breathing engine. Preferably, a pressure value of the outlet flow from the air-breathing engine is greater than a pressure value of the outlet flow of the rocket.

The propulsion system according to this invention is such that the outlet portions of the rocket and/or the air-breathing engine and/or the bypass duct are configured in such a way as to generate a train of shock waves inside the fluid flows characterised by local pressure and speed values such as to allow an anchoring of the combustion flame, for example by the simultaneous or separate operation of the rocket and the air-breathing engine.

Preferably, the rocket is a rocket powered by liquid fuel and the air-breathing engine is a turbojet configured for supersonic propulsion.

In the following description the term air-breathing engine and turbojet will the same element, in particular will be used the word turbojet that corresponding, for explanation purpose only and without any limitation, to the preferred embodiment of the present invention.

Preferably, the rocket operates autonomously and independently of the turbojet. More specifically, the rocket is always operational in any operating configuration of the propulsion system.

The turbojet of the propulsion system, in accordance with this invention, is susceptible of operating only in accordance with a particular operating configuration of the propulsion system and not in a continuous manner from the start-up on to the shut-down of the propulsion system.

With particular reference to the rocket of the propulsion system, in accordance with a preferred embodiment of the propulsion system, the rocket comprises a double wall of insulation and separation of an inner portion of the rocket relative to the outside.

Preferably, the double wall of the rocket is configured to allow a flow of a liquid fuel of the rocket in an operating configuration of the propulsion system. In other words, the rocket has at least one portion of the exhaust nozzle structured by a double wall in such a way that the rocket fuel can flow inside it in an isolated manner. The above-mentioned measure allows the thermal protection of the walls of the rocket from other fluid flows at a high temperature which touch it at the outside of the body, such as, for example, the outlet flow of the turbojet. Simultaneously, the double wall solution of the rocket makes it possible to pre-heat the liquid fuel of the rocket before the combustion process inside it.

Preferably, the rocket comprises a valve for controlling a flow, respectively, for the oxygen and for the fuel. The rocket, in accordance with this invention, comprises a system for feeding the fuel and the comburent which operates at low pressure, preferably at subsonic and transonic steady state operational speeds and it operates at high pressure, preferably at hypersonic steady state operational speeds.

Preferably, and without limiting the scope of the invention, the rocket is configured for using a fuel selected between liquid oxygen and kerosene RP1, liquid hydrogen and liquid oxygen or oxygen liquid and ethanol.

Advantageously, in accordance with this invention, the propulsion system with the rocket powered with kerosene allows use of a poorly refined kerosene (hence less expensive) compared with that generally used. In effect, the configuration of the propulsion system according to this invention having rocket and turbojet included in the bypass duct and all three of the elements having the outlet section coinciding in the same point allows for a compensation for any possible reduced addition of energy (thermal energy) of the poorly refined kerosene, compared with the prior art, by a more efficient energy conversion (from kinetic thermal) in the energy conversion region.

Kerosene is not the recommended fuel in the SCRAMJet of known type because it does not have a sufficient time of residence to completely burn the fuel.

Advantageously, in accordance with this invention, the kerosene injected for cooling the walls of the rocket is partly burnt in the combustion chamber and in the exhaust nozzle of the rocket generating a gas which is rich in free radicals at high temperature which is directed towards the combustion zone generated inside the supersonic combustor allowing the time necessary for a complete combustion to be reduced considerably.

Preferably, the rocket is responsible for injection of the fuel in the supersonic combustor and is also responsible for pre-combustion of the fuel preparing it for the combustion in the supersonic flow.

With particular reference to the turbojet of the propulsion system, in accordance with a preferred embodiment of the propulsion system, the turbojet comprises a fluid intake of the flow of fluid with a cross-section variable in a predetermined manner, in an operating configuration of the propulsion system.

Preferably, the rocket is configured to house in a portion of space at the outlet section of the turbojet.

The turbojet comprises a fluid intake of the type variable in a predetermined manner according to an operating configuration of the propulsion system, in particular according to a steady state flight speed of an aircraft fitted with the propulsion system according to this invention.

Preferably, the outlet portion of the turbojet is of the convergent-divergent type, still more preferably the outlet portion of the turbojet has a variable cross-section in an operating configuration of the propulsion system.

Preferably and without limiting the scope of the invention, the turbojet is configured to use a fuel selected between kerosene RP1, kerosene JP4, hydrogen or ethanol.

Preferably, the respective outlet sections of the rocket, the air-breathing engine and the bypass duct are configured for achieving an overall over-expanded outlet flow for achieving a predetermined geometry of the characteristic lines relative to the shock waves coming from the propulsion system.

The cone of shock waves coming from the propulsion system according to this invention is such as to direct the shock waves in particular towards the central portion of the flow, that is, towards the central axis of the propulsion system, in such a way as to prevent direct contact with physical walls of the propulsion system.

In accordance with the inventive concept of this invention, preferably an aircraft fitted with the propulsion system described above completes a hypersonic flight mission by means of a gliding manoeuvre, if necessary assisted by a propulsive thrust made using the combustion of the residual fuel. The combustion process of this flight manoeuvre may achieved using the rocket and/or the turbojet described above.

DETAILED DESCRIPTION OF PREFERRED EMBODIMENTS OF THE INVENTION

The accompanying drawings show in its entirety a propulsion system 1 for hypersonic aircraft in accordance with the inventive concept of this invention. According to a more technical and specific terminology relating to the sector of aerospace propulsion systems, this invention relates to a "rocket ignited supersonic combustion RAM jet (RISCRAM jet)".

It should be noted that the accompanying drawings are schematic and concern specifically the propulsion system 1 according to the inventive concept of this invention; therefore, known auxiliary systems for aerospace applications such as the tanks for fuel and/or comburent, delivery pumps, hydraulic systems or systems for management of the flows 100 of a fluid 110 are not illustrated in the accompanying drawings. The operating cycle the propulsion system 1 will be described below following an introduction of the main structural elements of the propulsion system 1.

In structural terms, the propulsion system 1 according to this invention comprises an air inlet 10 for a flow 100 of fluid 110, preferably atmospheric air, into the propulsion system 1.

Figure 4:
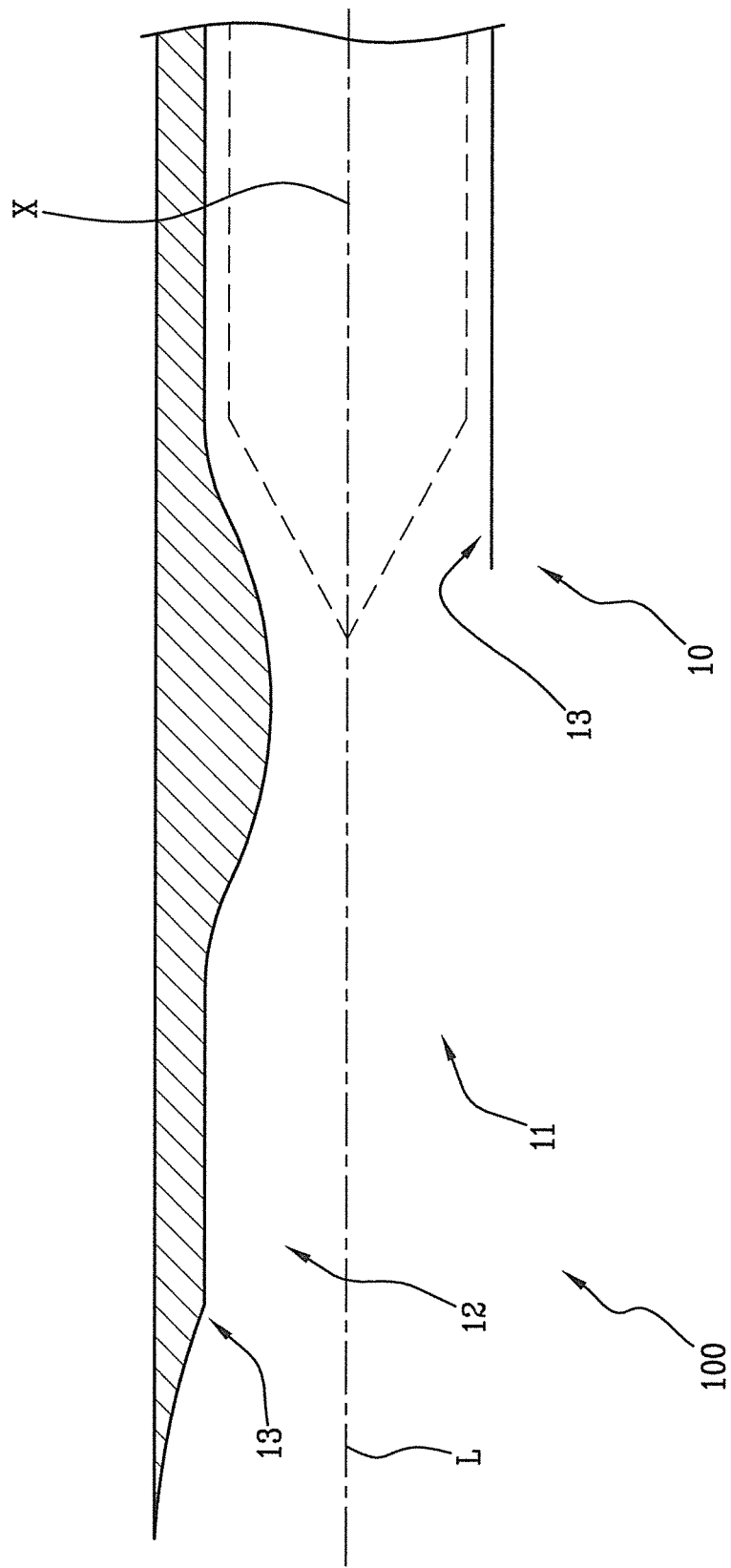
FIG. 4 is a detailed sectional of the propulsion system of FIG. 1 in accordance with this invention.

By way of a non-limiting example, FIG. 4 illustrates in detail a cross section of an air inlet 10 of the propulsion system 1 in accordance with the inventive concept of this invention.

Preferably, the air inlet 10 is always open in an operating configuration of the propulsion system 1.

The propulsion system 1 has a longitudinal direction of extension "L" which preferably is also the central axis "X" of the propulsion system 1.

The propulsion system 1 also comprises a containment duct 20, configured for making a separating wall between an internal space of the propulsion system 1 and the outside 200. Moreover, the containment duct 20 works structurally as a containment element for the various components of the propulsion system 1, described in more detail below.

Preferably, the containment duct 20 acts also as the anchoring element for fitting the propulsion system 1 in the fuselage or load-bearing structure of an aircraft.

The propulsion system 1 according to this invention also comprises an exhaust nozzle 30 preferably with a fixed diverging geometry; for example it may be configured like the expansion nozzle of the "X51" experimental aircraft.

For example and without limiting the scope of the invention, the exhaust nozzle 30 must be a divergent nozzle according to an operating configuration of the propulsion system 1.

The propulsion system 1 has the air inlet 10, the containment duct 20 and the exhaust nozzle 30 in fluid communication with each other. Preferably, the air inlet 10 of the fluid 110, the containment duct 20 and the exhaust nozzle 30 are positioned along/around the central axis "X" of the propulsion system 1.

In functional terms, at the three main elements included in the propulsion system 1, that is, the air inlet 10, the containment duct 20 and the exhaust nozzle 30, it is possible to identify by analogy the respective zones or stages at which thermodynamic-fluid transformations and/or interactions occur of a flow 100 of fluid 110, in an operating condition of the propulsion system 1.

Thus, a first stage 11 comprises the air inlet 10, illustrated schematically in FIG. 4, configured to intercept a predetermined quantity of fluid 110, preferably atmospheric air 110.

The air inlet 10 of the propulsion system 1 has a shaped section 12 configured to reduce the recirculating region of the fluid 110 intercepted. Preferably, for this purpose the shaped section 12 has a side wall 13 having a cusp 13$a$ facing towards the central axis "X".

Preferably, no combustion process occurs in the first stage 11 of the propulsion system 1 so the air 100 undergoes fluid-thermodynamic processes without the addition of energy using combustion processes.

A second stage 21, adjacent to the first stage 11, which comprises at least the containment duct 20 is configured to treat the air 100 sucked in the propulsion system 1 by thermodynamic and fluid dynamic transformations. In particular, the second stage 21 of the propulsion system 1 comprises an air-breathing engine 22 and a rocket 23 positioned in a concentric manner relative to each other and coaxially relative to the central axis "X".

A third stage 31, adjacent to the second stage 21, can be identified at the exhaust nozzle 30 of the propulsion system 1. The propulsion system 1 at the third stage 31 comprises a flame pipe 32 positioned inside the containment duct 20. Preferably, the flame pipe 32 is positioned starting from an end portion of the second stage 21 of the propulsion system 1.

The flame pipe 32 extends for a stretch between an outlet portion at least of the air-breathing engine 22 and the exhaust nozzle 30; preferably, the flame pipe is concentric with the containment duct 20. Preferably, the flame pipe 32 comprises a plurality of through holes (not illustrated in the accompanying drawings) along its entire surface.

Preferably, the surface which defines the flame pipe 32 can be made by means a wall with a corrugated shape or folded in concertina fashion.

Further details of the structure and the function of the flame pipe 32 are described in more detail below.

The propulsion system 1 comprises a bypass duct 40 which preferably extends from the air inlet 10 to the exhaust nozzle 30. More specifically, the bypass duct 40 comprises a first inlet zone 41 of the air 100, a second zone 42 for transporting the air flow 100 intercepted along the propulsion system 1 and a third outlet zone 43 of a flow 40a processed by the bypass duct 40.

Preferably, in an operating condition of the propulsion system 1, the propulsion system 1 is such that the flow 40a of air 100 processed by the bypass duct 40 is mixed with flows 23a and 22a processed respectively by the rocket 23 and/or the air-breathing engine 22. In other words, the rocket 23 processes, when in operation, an outlet flow 23a and the air-breathing engine 22 processes, when in operation, a flow 22a of fluid 100 intercepted by the air inlet 10 of the propulsion system. Subsequently, the flows 23a, 22a processed, respectively, by the rocket 23 and by the air-breathing engine 22 are mixed at least partly with the flow 40a processed by the bypass duct 40.

More in detail, the rocket 23, the air-breathing engine 22 and the bypass duct 40 have respective outlet sections 23b, 22b and 40b positioned at outlet portions from which the respective flows 23a, 22a and 40a have been expelled.

Preferably, the outlet sections 23b, 22b and 40b, respectively, of the rocket 23, the air-breathing engine 22 and the bypass duct 40 lie in a single plane "P" positioned transversely relative to the longitudinal direction of extension "L" of the propulsion system, even more preferably, the plane "P" is perpendicular the central axis "X" the propulsion system 1.

Figure 1:
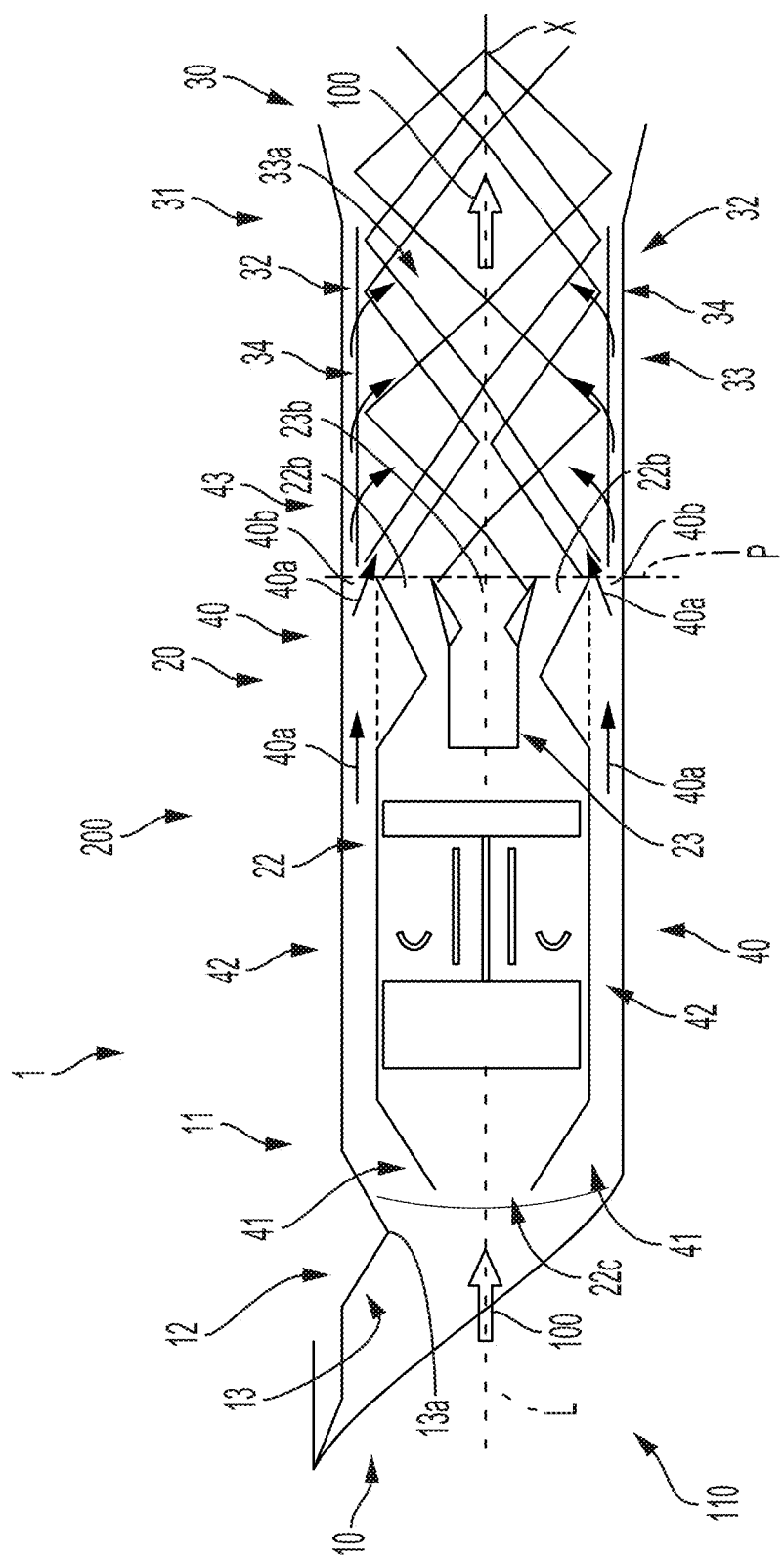
FIG. 1 is a schematic sectional view of a propulsion system in accordance with this invention.

Preferably, with reference to FIG. 1, the outlet section 22b of the air-breathing engine 22 is located in a radially external position relative to the outlet section 23b of the rocket 23. Preferably, the outlet section 40b of the bypass duct 40 is located in a radially external position relative to the outlet section 22b of the air-breathing engine 22.

Advantageously, the propulsion system 1, the bypass duct 40, the air-breathing engine 22 and the rocket 23 are operatively associated with each other and configured for processing the respective flows 40a, 22a and 23a in such a way as to generate a thermodynamic-fluid interaction between them in a same portion of inner space 33, in an operating configuration of the propulsion system 1.

The portion of space 33 is inside the containment duct 20, preferably positioned at the third stage 31 of the propulsion system 1, downstream of the outlet sections 22b, 23b and 40b respectively of the air-breathing engine 22, rocket 23 and bypass duct 40.

The flows 23a and 22a processed at the outlets from the outlet sections 23b and 22b of the rocket 23 and of the air-breathing engine 22 derive from a combustion process whilst the flow 40b at the outlet from the bypass duct 40 derives from a fluid dynamic process of viscous flow through a section of the containment duct 20.

Preferably, the portion of inner space 33 comprises a supersonic combustor 33a of the propulsion system 1. The portion of the supersonic combustor 33a is a smaller region of the portion of inner space 33 which is positioned radially central relative to the containment duct 20, preferably extending around the central axis "X" the propulsion system 1.

The supersonic combustor 33a is contained substantially in the portion of inner space 33 defined by the flame pipe 32. Advantageously, the region of the supersonic combustor 33a is the region of the propulsion system 1 wherein there is an increase in the enthalpy which can be derived from the conversion of thermal energy into kinetic energy, preferably, the region of the supersonic combustor 33a is the region where there is the greatest increase in the enthalpy of the operating cycle of the propulsion system 1.

The rocket 23 and/or the air-breathing engine 22 are configured to produce thermal energy by a combustion process, to provide fuel and oxidiser needed for combustion and convey the respective flows 23a and 22a processed towards the supersonic combustor 33a.

Preferably, the portion of inner space 33 is free, that is, it does not contain structural elements configured to trigger a recirculation of the flow of fluid 100 and/or an anchoring of a flame of a combustion process.

With particular reference to the flame pipe 32, it has along its entire extension a transversal cross-section less than a cross-section of the containment duct 20 in such a way as to define between the flame pipe 32 and the containment duct 20 a transit channel 34 of the flow 100 of fluid 110. Preferably, the transit channel 34 is annular in shape defined between a wall of the containment duct 20 and the flame pipe 32 and extends along the central axis "X" at least for the entire length of the flame pipe 32.

In other words, the flame pipe 32 makes it possible divide the flow 40a processed by the bypass duct 40 into two portions almost completely separate, preferably at the third outlet zone 43 of the bypass duct 40. In effect, the holes (and/or superposed surfaces) on the surface of the flame pipe 32 allow the simultaneous tapping of the flow 40a processed by the bypass duct 40 and the residual portion of flow 40a to be kept and contained in a perimeter region such as to touch the walls of the containment duct 20 up to the exhaust nozzle 30 of the propulsion system 1.

In an operating condition of the propulsion system 1, the flow 100 of fluid 110 inside the transit channel 34, retained between the flame pipe 32 and the wall of the containment duct 20 is a single-phase flow (that is, it comprises only a fluid/substance in the gaseous state) which advantageously allows the creation of an effective thermal and mechanical insulation effect, insulating against both high temperature and any vibrations deriving from the shock waves present in the containment duct 20.

According to a preferred embodiment the propulsion system 1, the rocket 23 is a rocket powered by liquid fuel whilst the air-breathing engine 22 is a turbojet configured for supersonic propulsion, preferably powered by liquid fuel.

In the following description the term air-breathing engine and turbojet will the same element and will be signed by the reference number 22.

In another embodiment of the present invention, not illustrated in the drawings attached, preferably the air-breathing engine 22 is a turbofan engine.

It should be noted that in the following description the reference numeral of the rocket 23 refers specifically to a rocket 23 whilst that of the turbojet 22 refers specifically to a supersonic turbojet 22.

Preferably, the rocket 23 operates autonomously and independently of the turbojet 22. The rocket 23 comprises a double wall (not illustrated) for insulating and separating an inner portion of the rocket 23 relative to the outside 200 and allows the flowing of a liquid fuel of the rocket 23 to pre-heat it before the combustion process in the rocket 23.

With reference to the turbojet 22, it is configured to house at least partly the rocket 23 in a portion of space at the outlet section of the turbojet. The outlet section 22b of the turbojet 22 is of the variable and adaptable type, preferably of the convergent-divergent type with variable cross section.

According to the inventive concept of this invention, it should be noted that the configuration of the exhaust nozzle 30, the rocket 23, the turbojet 22 and the bypass duct 40 are sized and configured in such a way as to create a sequence of shock waves (schematically illustrated in the accompanying drawings, without specific references) which are ideal for efficiently burning fuel in the supersonic combustor 33a.

Moreover, for the sizing of the outlet sections 22b and 23b respectively of the turbojet 22 and the rocket 23, the important parameter is the pressure ratio with the air which must guarantee the formation of oblique shock waves in particular inside the supersonic combustor of the propulsion system 1.

Since the bypass duct 40 and the turbojet 22 supply the oxygen for the combustion in the propulsion system 1, the construction criteria for the propulsion system 1 are therefore also dependent on the mass flow rate of the propulsion system 1 and the type of fuel used and may vary to keep the combustion phenomenon with oblique shock waves in the stretch of the propulsion system 1 between the region 6 and the region 7. More specifically, the numeral 33a in the accompanying drawings illustrates schematically by way of example a train of oblique shock waves.

This characteristic of the train of shock waves inside the propulsion system 1 determines the design length of the section 6 to 7 of the containment duct 20.

The propulsion system 1 has all the main elements included in it adapted and configured according to a precise sequence of operations. More specifically, a first step preferably comprises combining the bypass duct 40, the rocket 23 and the turbojet 22 in such a way as to create the sequence of ideal shock waves, as described above.

A subsequent step comprises the construction of the geometries and the calculation of the dimensions of the propulsion system 1, in particular in the stretch 6 to 9, in such a way that the supersonic flame is contained as much as possible inside the supersonic combustor 33a and the exhaust nozzle 30 of the propulsion system 1.

With reference to the operation of the propulsion system 1 according to the inventive concept of this invention, a description is given below by way of example of the operational steps of the propulsion system 1 from the start-up to shut-down. It should be noted that the step of switching off the propulsion system 1 corresponds with the step of completing a flight mission of an aircraft fitted with the propulsion system 1 according to this invention.

It should be noted that in FIGS. 2 to 3B numerals 0 to 9 denote the functional points of the propulsion system 1 on the basis of standard SAE AS 755—"Aircraft Propulsion System Station Performance Designation" and numerals 10 to 200 denote the structural elements the propulsion system 1.

Figure 5:
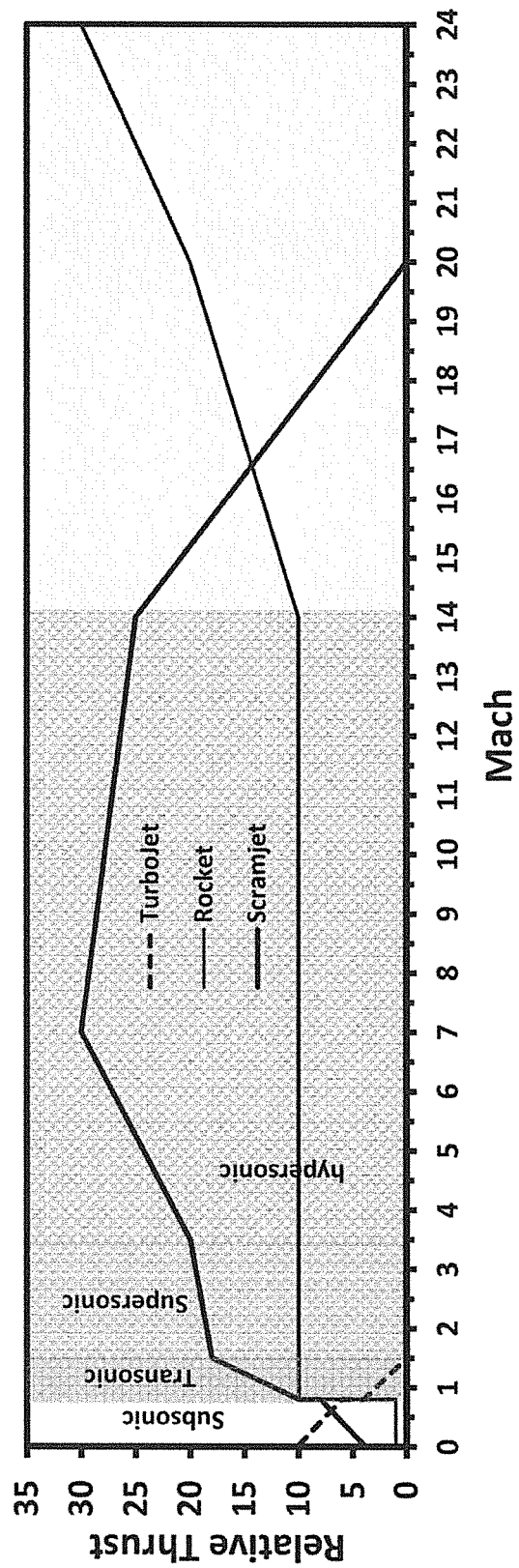
FIG. 5 shows a Cartesian graph relative to certain physical operational parameters of the propulsion system in accordance with this invention.

The diagram shown in FIG. 5 provides by way of an example a contribution of the thrust of the rocket, the exothermic reactor and the bypass duct relative to the relative speed (in Mach). It should be noted that the thrust is indicated in a dimensionless manner since it relates to the thrust of the pure turbojet 22 at the speed of 0.03 Mach at sea level (in the example shown in FIG. 5 the thrust is approximately 10 kN).

When the propulsion system 1 is switched on the operating conditions provide for a take-off from sea level of an aircraft starting from a fixed point, that is, with zero relative speed relative to the ground.

With reference to FIG. 3, the propulsion system 1 switched on at a fixed point at sea level has the turbojet 22 switched on and operating at full steady-state condition. The access mouths at points 0.1, 1 and 1.1 are completely open to allow the introduction of air 110 in the propulsion system 1. The rocket 23 is switched on at minimum power. The bypass duct 40 is already active due to the effect of the flow 23a processed by the rocket 23 at minimum power and due to the effect of the flow 22a processed by the turbojet 22 at full power. In the stretch of the supersonic combustor 33a, which by way of example in FIGS. 2 to 3B corresponds to the stretch from point 6 to point 7 of the propulsion system 1, the steady state flow 100 is supersonic and the three flows 40a, 22a and 23a are concentric. The flow processed by the rocket 23 is contained in a limited region, as indicated schematically by the dashed line "C" in FIG. 3. During this step, the bypass duct 40 operates like the SCRAMJet of known type. The flow processed by the bypass duct 40 is "cold" "relative to those processed by the rocket 23 and by the turbojet 22 and has a propulsive effect which overall is greater in the stretch 7 to 9 at the divergent exhaust nozzle 30 of the propulsion system 1.

It should be noted that the points 1.6-2.9-5.9 define the region of contact of the outlet flows 40a, 22a, 23a deriving respectively from the bypass duct 40, the turbojet 22 and the rocket 23.

With the increase in the relative speed of the aircraft and of the propulsion system 1 until reaching a steady state of between 1.2 Mach and 1.5 Mach, the access mouth of the turbojet 22 is closed (see point 1 in FIG. 3A).

In an acceleration phase, that is, at a steady state greater than 1.5 Mach, the rocket 23 is brought to a greater power whilst the turbojet 22 is definitively switched off since the respective air intake 22c (point 1 in FIGS. 2 to 3B) is closed, and therefore there is no longer the addition of air 110 from the outside 200.

In the supersonic combustor 33a the flow 23a processed by the rocket 23 expands up to the dashed line "D" in FIG. 3, almost until touching the flame pipe 32. In reality, the outlet flow of 23a processed by the rocket 23 is surrounded by a part of the cold flow 40a processed by the bypass duct

40. The rocket 23 works harder and the addition of fuel and comburent are increased, whilst the flame of the combustion process moves close to inner walls of the rocket 23. For this reason, the outlet flow 23a processed by the rocket 23 has a higher temperature at the centre and a lower temperature at the peripheral portion, close to the dashed line "D".

At the exhaust nozzle 30, from point 7 to point 9 in FIGS. 2 to 3B, the temperature of the overall outlet flow (flow 40a, joined to flow 23a) is more uniform than the switching on and accelerating step of the propulsion system 1.

In a further acceleration phase, that is, at a steady state greater than 7 Mach (hypersonic steady state flight), the rocket 23 is controlled so that the temperature at the exhaust nozzle 30 (point 7) is uniform and, above all, does not exceed the structural limits of the components of the propulsion system 1. The control of the fuel and comburent flow in the rocket 23 occurs by means of the hydraulic valves not illustrated in the accompanying drawings.

For a steady state flight of 17 Mach and greater, illustrated in FIG. 3B, the bypass duct is ineffective in the operation of the known SCRAMJet type, the air inlet, at the point 1.2 in FIGS. 2 to 3B, of the bypass duct 40 closes. The outlet flow 23a processed by the rocket 23 expands further no longer having a "jacket" containing the flow 40a processed by the bypass duct 40, as in the preceding steps.

Preferably, in the flight phase to 17 Mach the flow rate of the outlet flow 23a of the rocket 23 is proportional to the pressure of the flow 23a in the containment duct 20, in particular in the supersonic combustor 33a. The rocket 23 continuous its operation from this phase up to the consumption of the fuel and/or comburent available on board the hypersonic aircraft.

As already mentioned, the hypersonic aircraft completes the hypersonic flight mission by means of a gliding manoeuvre, if necessary assisted by a residual propulsive thrust of the rocket 23.

The invention achieves the above mentioned aims.

Advantageously, the propulsion system of this invention operates from a fixed point up to a hypersonic steady state flight in an autonomous manner. In other words, the propulsion system according to this invention makes it possible to not have to provide the conditions of the physical variables such as speed, pressure and air density which are typical for the operation of a SCRAMJet propulsion system of known type, for example by the use of auxiliary engines to achieve these operating conditions.

Advantageously, the propulsion system according to this invention can be installed on board any type of hypersonic aircraft and allows a flight mission of the aircraft from a fixed point at sea level up to hypersonic steady state at an altitude of approximately 500 km.

Advantageously, the propulsion system according this invention has lower mechanical vibrations and greater reliability by means of an increased thermal insulation of the hot part compared with traditional propulsion systems.

Advantageously, the propulsion system according to this invention operates with liquid fuels, which are more conventional than prior state of art propulsion systems.

Advantageously, the propulsion system according to this invention comprises a more efficient rocket with a more effective and complete combustion thanks to the fact that at least the liquid fuel is pre-heated before injection into a combustion chamber of the rocket.

Advantageously, the propulsion system according to this invention has a greater efficiency as it is configured in such a way as to convert the thermal energy to kinetic energy in a single region inside the propulsion system and in which all the flows processed respectively by the bypass duct, the rocket and the turbojet are mixed and interact with each other using thermodynamic-fluid processes.

What is claimed is:

1. A propulsion system (1) for hypersonic aircraft, comprising:
    an air inlet (10) for a fluid (110);
    a containment duct (20), comprising a flame pipe (32) positioned inside the containment duct (20);
    an exhaust nozzle (30); wherein the air inlet (10), the containment duct (20) and the exhaust nozzle (30) are in fluid communication with each other; and
    wherein the propulsion system (1) comprises a bypass duct (40) configured to process a bypass duct flow (40a) at a bypass duct outlet (40b), an air-breathing engine (22) configured to process an air-breathing engine flow (22a) of the fluid (110) at an air-breathing engine outlet (22b) and a rocket (23) configured to process a rocket flow (23a) at a rocket outlet (23b), the bypass duct outlet (40b), the air-breathing engine outlet (22b) and the rocket outlet (23b) being operatively arranged to terminate in a single plane (P) upstream of a first end of the flame pipe (32) at an inner space (33) of the containment duct (20) to generate a fluid-thermodynamic interaction in a portion of the inner space (33) between the bypass duct flow (40a), the air-breathing engine flow (22a) and the rocket flow (23a) processed in an operating configuration of the propulsion system (1), the portion of the inner space (33) being inside the containment duct (20),
    wherein the propulsion system (1) comprises a longitudinal direction of extension (L) relative to which the rocket flow (23a) of the fluid (110) flows in a centered manner along a central axis (X) of the containment duct (20) perpendicular to the single plane (P) upstream of the first end of the flame pipe (32) at the inner space (33) of the containment duct (20) and wherein the bypass duct (40) is configured for interacting with the rocket (23) and/or the air-breathing engine (22) in accordance with the operating cycle of a SCRAMJet propulsion system.

2. The propulsion system (1) according to claim 1, wherein the portion of the inner space (33) comprises a region of a supersonic combustor (33a) of the propulsion system (1) in which an increase occurs in enthalpy which can be derived from a conversion of chemical energy of a fuel into thermal energy, the region of the supersonic combustor (33a) being located in a radially central position relative to the containment duct (20) of the propulsion system (1), and wherein at the exhaust nozzle (30) the thermal energy is converted into a kinetic energy.

3. The propulsion system (1) according to claim 2, wherein the air-breathing engine (22) and/or the rocket (23) are configured for making the thermal energy by a combustion process, the air-breathing engine (22) and the rocket (23) being configured for conveying the respective air-breathing engine flow (22a) and the rocket flow (23a) towards the supersonic combustor (33a).

4. The propulsion system (1) according to claim 1, in which the air-breathing engine flow (22a) of the fluid (110) being located in a position radially outside the rocket flow (23a) and the bypass duct flow (40a) being located in a position radially outside the air-breathing engine flow (22a).

5. The propulsion system (1) according to claim 1, wherein the rocket outlet (23b), the air-breathing engine outlet (22b) and the bypass duct outlet (40b) are coaxial with the central axis (X) and wherein the air-breathing engine outlet (22b) is positioned in a position radially outside the rocket outlet (23b) and the bypass duct outlet (40b) located in a position radially outside the air-breathing engine outlet (22b).

6. The propulsion system (1) according to claim 1, wherein the rocket flow (23a) and the air-breathing engine flow (22a) processed at the rocket outlet (23b) and the air-breathing engine outlet (22b), respectively, derive from a combustion process and the bypass duct flow (40a) processed by the bypass duct outlet (40b) derives from a fluid dynamic process of viscous flow through the bypass duct (40), the bypass duct flow (40a) processed by the bypass duct (40) having a temperature and a concentration of oxygen approximately equal to a temperature and a concentration of oxygen of the bypass duct flow (40a) at a bypass duct inlet of the bypass duct (40) of the propulsion system (1).

7. The propulsion system (1) according to claim 1, wherein the rocket (23) uses liquid fuel and the air-breathing engine (22) is a turbojet configured for supersonic propulsion.

8. The propulsion system (1) according to claim 1, wherein the flame pipe (32) extending for a stretch between the rocket outlet (23b), the air-breathing engine outlet (22b), the bypass duct outlet (40b) at the first end of the flame pipe (32), and the exhaust nozzle (30) at a second end of the flame pipe (32) being concentric to the containment duct (20).

9. The propulsion system (1) according to claim 8, wherein the flame pipe (32) has along an entire extension of the flame pipe (32) a transversal cross-section less than a cross-section of the containment duct (20) to define between the flame pipe (32) and the containment duct (20) a transit channel (34) of the bypass duct flow (40a) of the fluid (110), the transit channel (34) being annular in shape.

10. The propulsion system (1) according to claim 1, wherein the bypass duct flow (40a) of the fluid (110) which is uniform through an annular transit channel (34) is subjected to a flow rate reduction by partial spillage of the bypass duct flow (40a) to direct a part of the bypass duct flow (40a) towards a supersonic combustor (33a), a residual portion of the bypass duct flow (40a) passing through the annular transit channel (34) being a cold flow not involved in a combustion process.

11. The propulsion system (1) according to claim 10, wherein said flame pipe (32) comprises a plurality of through holes and/or a corrugated wall along a surface to simultaneously allow a partial spillage of the bypass duct flow (40a) to keep the residual portion of the bypass duct flow (40a) in a perimeter region relative to the supersonic combustor (33a) of the propulsion system (1).

12. The propulsion system (1) according to claim 10, wherein a speed of the rocket flow (23a), the air-breathing engine flow (22a) and the bypass duct flow (40a) at an outlet from the rocket outlet (23b), the air-breathing engine outlet (22b), and the bypass duct outlet (40b) is between Mach 1.5 and Mach 3.5, and a speed of the rocket flow (23a), the air-breathing engine flow (22a) and the bypass duct flow (40a) at a supersonic combustor outlet (7) is approximately Mach 2.

13. The propulsion system (1) according to claim 10, wherein the bypass duct flow (40a) has a pressure value greater than a pressure value of the air-breathing engine flow (22a) and wherein the pressure value of the air-breathing engine flow (22a) is greater than a pressure value of the rocket flow (23a) of the rocket (23), wherein pressure ratios between the rocket flow (23a), the air-breathing engine flow (22a) and the bypass duct flow (40a) are registered in correspondence with the supersonic combustor (33a) of the propulsion system (1).

14. The propulsion system (1) according to claim 12, wherein the rocket outlet (23b), the air-breathing engine outlet (22b) and the bypass duct outlet (40b) are configured to generate a shock waves trail inside the supersonic combustor (33a) by different local pressure and speed values from each of the rocket outlet (23b), the air-breathing engine outlet (22b) and the bypass duct outlet (40b) to allow anchoring in predetermined points of a combustion flame generated by an operation of said rocket (23) and/or said air-breathing engine (22) and the bypass duct flow (40a), wherein the rocket (23) and the bypass duct flow (40a) providing oxygen while the rocket (23) providing heated fuel cracked towards said portion of the inner space (33).

15. The propulsion system (1) according to claim 7, wherein the rocket (23) operates autonomously and independently of the air-breathing engine (22), the rocket (23) being operational in an operating configuration of the propulsion system (1).

16. The propulsion system (1) according to claim 15, wherein the rocket (23) comprises a double wall for insulating and separating an inner portion of the rocket (23) relative to an outside (200), wherein the double wall being configured to allow flowing of a liquid fuel of the rocket (23) in the operating configuration of the propulsion system (1).

17. The propulsion system (1) according to claim 15, wherein the rocket (23) is configured for using a comburent and a fuel selected between liquid oxygen and kerosene RP 1, liquid oxygen and liquid hydrogen, or liquid oxygen and ethanol.

18. The propulsion system (1) according to claim 7, wherein the air-breathing engine (22) comprises a fluid intake (22c) for the air-breathing engine flow (22a) of the fluid (110) at the air-breathing engine outlet (22b) with a variable cross-section in a predetermined manner in the operating configuration of the propulsion system (1).

19. The propulsion system (1) according to claim 18, wherein the air-breathing engine (22) is configured to hold, at least partly, the rocket (23) in a portion of space of the turbojet (22).

20. The propulsion system (1) according to claim 17, wherein the air-breathing engine outlet (22b) being of a variable type in a predetermined manner in the operating configuration of the propulsion system (1), the air-breathing engine outlet (22b) being of the convergent-divergent type.

21. The propulsion system (1) according to claim 17, wherein said air-breathing engine (22) is configured to use a fuel selected between kerosene RP1, kerosene JP4, hydrogen or ethanol.

22. The propulsion system (1) according to claim 1, wherein the bypass duct flow (40a) processed by the bypass duct (40) being at a lower temperature than the respective rocket flow (23a) processed by the rocket (23) and/or the air-breathing engine flow (22a) processed by the air-breathing engine (22).

23. The propulsion system (1) according to claim 4, wherein the air inlet (10) of the propulsion system (1) has a shaped cross section (12) configured to reduce a viscous friction of a combined inlet flow of the fluid (110) and a formation of regions of recirculation of the combined into flow of the fluid (110), wherein the shaped section (12) having a lateral wall (13) having a cusp (13a) facing towards the central axis (X) of the propulsion system (1).

24. The propulsion system (1) according to claim 1, wherein the exhaust nozzle (30), the rocket (23), the airbreathing engine (22) and the bypass duct (40) are configured to allow the formation of a sequence of ideal, oblique shock waves suitable to burn fuel in a supersonic combustor (33*a*), wherein said sizing of the air-breathing engine outlet (22*b*) and the rocket outlet (23*b*) respectively of the air-breathing engine (22) and the rocket (23) being parameterized according to an expansion ratio of the fluid (110) to allow the formation of the ideal, oblique shock waves inside the supersonic combustor (33*a*) of the propulsion system (1).

25. A method for hypersonic propulsion for a hypersonic aircraft, comprising:
- preparing a hypersonic propulsion system (1) on board the hypersonic aircraft;
- freeing a first inlet zone (41) of a bypass duct (40);
- opening a fluid intake (22*c*) of an air-breathing engine (22);
- activating the hypersonic propulsion system (1) by triggering a process of combustion in a rocket (23) and air-breathing engine (22) in a first operating condition of the hypersonic propulsion system (1) at sea level and at a fixed point;
- adjusting an operational power of the rocket (23) to a minimum value and an operational power of the air-breathing engine (22) to a maximum power steady state;
- regulating an input flow rate of a fluid (110) through the fluid intake (22*c*) of the air-breathing engine (22) as a relative speed increases of the hypersonic propulsion system (1) and the hypersonic aircraft relative to an outside (200);
- gradually increasing the operational power of the rocket (23);
- adapting a rocket outlet (23*b*) and an air-breathing engine outlet (22*b*) as a function of variations in altitude and the relative speed of the hypersonic propulsion system (1) relative to the fixed point at the sea level;
- deactivating the air-breathing engine (22) by closing access of the fluid (110) through the fluid intake (22*c*) when the relative speed is between about Mach 1.5 and Mach 30;
- increasing the operational power of the rocket (23);
- adjusting the operational power of the rocket (23) as a function of the predetermined mission specifications of the hypersonic aircraft, including at least one of ceiling, attitudes, and the relative speed and according to a temperature value along a containment duct (20);
- deactivating the bypass duct (40) by closing access of the fluid (110) inside the first inlet zone (41) when the relative speed is between about Mach 17 and Mach 30 at an altitude of a terrestrial exosphere;
- adjusting the operational power of the rocket (23) as a function of the predetermined mission specifications of the hypersonic aircraft;
- preparing a maneuver for return from a flight mission of the hypersonic aircraft fitted with the hypersonic propulsion system (1) in a second operating condition wherein the rocket (23) is active and fuel and/or comburent is below a predetermined level or the hypersonic propulsion system (1) is switched off, and setting the hypersonic aircraft in glide mode until ending at the sea level,
- wherein the hypersonic propulsion system (1) comprises the bypass duct (40) configured to process a bypass duct flow (40*a*) at a bypass duct outlet (40*b*), the air-breathing engine (22) configured to process an air-breathing engine flow (22*a*) of the fluid (110) at the air-breathing engine outlet (22*b*) and the rocket (23) configured to process a rocket flow (23*a*) at the rocket outlet (23*b*), the bypass duct outlet (40*b*), the air-breathing engine outlet (22*b*) and the rocket outlet (23*b*) being operatively arranged to terminate in a single plane (P) upstream of a first end of a flame pipe (32) at an inner space (33) of the containment duct (20) to generate a fluid-thermodynamic interaction in a portion of the inner space (33) between the bypass duct flow (40*a*), the air-breathing engine flow (22*a*) and the rocket flow (23*a*) processed during operation of the hypersonic propulsion system (1), the portion of the inner space (33) being inside the containment duct (20).

* * * * *